United States Patent
Maier et al.

(10) Patent No.: US 10,439,350 B2
(45) Date of Patent: Oct. 8, 2019

(54) ARRANGEMENT FOR GUIDING AND/OR HOLDING ELECTRICALLY CONDUCTIVE SLIDING CONTACT ELEMENTS

(71) Applicant: SIEMENS AKTIENGESELLSCHAFT, München (DE)

(72) Inventors: Josef Maier, Taufkirchen an der Pram (AT); Herbert Binder, Neuburg (DE); Robert Gruber, Ruhstorf (DE); Martin Krompass, Passau (DE); Oliver Memminger, Neuburg am Inn (DE); Klaus Schifferer, Neuburg am Inn (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/577,670

(22) PCT Filed: Apr. 15, 2016

(86) PCT No.: PCT/EP2016/058351
§ 371 (c)(1),
(2) Date: Nov. 28, 2017

(87) PCT Pub. No.: WO2016/192883
PCT Pub. Date: Dec. 8, 2016

(65) Prior Publication Data
US 2018/0166844 A1 Jun. 14, 2018

(30) Foreign Application Priority Data
May 29, 2015 (EP) .................................. 15169934

(51) Int. Cl.
*H01R 39/41* (2006.01)
*H02K 13/10* (2006.01)
(Continued)

(52) U.S. Cl.
CPC .............. *H01R 39/41* (2013.01); *H01R 39/58* (2013.01); *H02K 9/28* (2013.01); *H02K 13/003* (2013.01)

(58) Field of Classification Search
CPC ........ H01R 39/41; H01R 39/58; H01R 39/00; H01R 39/415; H01R 39/62; H01R 39/38;
(Continued)

(56) References Cited

U.S. PATENT DOCUMENTS 4,329,611 A    5/1982  Ohmstedt
4,602,181 A *  7/1986  Dietrich .................. H02K 5/14
                                                    310/241

(Continued)

FOREIGN PATENT DOCUMENTS

DE    19 46 775 A1    3/1971
DE    32 30 298 A1    3/1983
(Continued)

OTHER PUBLICATIONS

Machine translation of DE-10003900-A1. (Year: 2002).*
(Continued)

*Primary Examiner* — Michael Andrews
(74) *Attorney, Agent, or Firm* — Henry M. Feiereisen LLC (57) ABSTRACT

A contact-making rotary transmission includes a brush forming an electrically conductive sliding contact element and a contact path of electrically conductive material for contact with the brush. The brush is guided and/or held by an arrangement which includes a plurality of carrier segments arranged axially behind one another. Each carrier segment has attached thereto a brush receptacle such as to define a first gap between the carrier segment and the brush receptacle. The brush receptacle includes a stationary receiving shaft which is formed by walls and configured to receive the
(Continued)

brush, and a guide element which is provided on a wall of the receiving shaft so as to define a second gap between the brush and the wall. At least one of the walls includes an opening in communication with the first and second gaps to allow a flow of cooling air for cooling the brush.

13 Claims, 6 Drawing Sheets

(51) Int. Cl.
*H01R 39/58* (2006.01)
*H02K 9/28* (2006.01)
*H02K 13/00* (2006.01)

(58) Field of Classification Search
CPC ...... H02K 13/003; H02K 13/10; H02K 13/00; H02K 9/28
USPC ................................ 310/227, 239, 242, 228
See application file for complete search history.

(56) References Cited

U.S. PATENT DOCUMENTS

| | | | |
|---|---|---|---|
| 5,731,650 A * | 3/1998 | Scheucher | H01R 39/58 310/242 |
| 8,648,505 B2 | 2/2014 | Memminger et al. | |
| 8,686,607 B2 | 4/2014 | Memminger et al. | |
| 9,225,224 B2 | 12/2015 | Memminger et al. | |
| 2006/0089009 A1 | 4/2006 | Krumme | |
| 2009/0066185 A1* | 3/2009 | Kurasawa | H01R 39/40 310/239 |
| 2011/0254395 A1 | 10/2011 | Memminger et al. | |
| 2012/0187793 A1 | 7/2012 | Memminger et al. | |
| 2014/0021824 A1* | 1/2014 | Gayosso | H02K 5/148 310/227 |
| 2015/0318741 A1 | 11/2015 | Schifferer et al. | |

FOREIGN PATENT DOCUMENTS

| | | | | |
|---|---|---|---|---|
| DE | 195 22 329 | A1 | 1/1997 | |
| DE | 100 03 900 | A1 | 5/2002 | |
| DE | 10003900 | A1 * | 5/2002 | ............. H01R 39/08 |
| DE | 101 33 767 | A1 | 1/2003 | |
| DE | 103 19 248 | A1 | 12/2004 | |
| EP | 2 835 890 | A1 | 2/2015 | |

OTHER PUBLICATIONS

PCT International Search Report and Written Opinion of International Searching Authority dated Jun. 24, 2016 corresponding to PCT International Application No. PCT/EP2016/058351 filed Apr. 15, 2016.

* cited by examiner

ARRANGEMENT FOR GUIDING AND/OR HOLDING ELECTRICALLY CONDUCTIVE SLIDING CONTACT ELEMENTS

CROSS-REFERENCES TO RELATED APPLICATIONS

This application is the U.S. National Stage of International Application No. PCT/EP2016/058351, filed Apr. 15, 2016, which designated the United States and has been published as International Publication No. WO 2016/192883 and which claims the priority of European Patent Application, Serial No. 15169934.5, filed May 29, 2015, pursuant to 35 U.S.C. 119(a)-(d).

BACKGROUND OF THE INVENTION

The invention relates to an arrangement for guiding and/or holding electrically conductive sliding contact elements, a contact-making rotary transmission with an arrangement of this type and also a dynamoelectric machine with a contact-making rotary transmission.

With dynamoelectric machines, for instance generators or drive motors, a current can be extracted from or supplied to a rotor of the dynamoelectric machine by way of a sliding ring unit. With larger dynamoelectric machines, such as generators in wind power plants, generators and their components are now designed to be increasingly more compact in order to optimize costs and installation space in these wind power plants. With a constant size, this results in the sliding ring unit, in other words individual components of the sliding ring unit, being loaded with increasingly higher currents. For this reason the temperatures increase significantly there, particularly on the conductive sliding contact elements, in other words the sliding ring brushes and their holders, in other words the brush holders.

Furthermore, for cost reasons the contact path of the sliding ring surface is not increased in size with increasing outputs, which results in an additional heating inter alia of the sliding ring brush. The increasing thermal stress on these components therefore results in the temperatures of the entire sliding ring unit also increasing to a critical temperature value, and therefore damages may arise to the sliding rings, to the sliding ring brushes and finally to the overall plant.

Furthermore, from a certain size and output of dynamoelectric machines, sliding ring elements with a larger external diameter are used. As a result the holding unit of the conductive sliding contact elements used is also correspondingly larger. Therefore, high temperatures are avoided, since, inter alia, the work area of the sliding ring element is significantly increased in size. However, the overall installation volume is as a result likewise increased in size accordingly.

This ultimately results now in a higher material outlay and material costs due to the generous sizing of the individual components, and on the other hand the external dimensions of a generator likewise increase impermissibly.

A known power transmission arrangement via electric machines is known from DE 100 03 900 A1, wherein in order to achieve adequate cooling sliding rings of support rings are assumed, which are arranged axially one behind the other and are electrically insulated from one another and are air-flushed.

Sliding ring arrangements are also known from DE 32 30 298 A1, DE 103 19 248 A1 and U.S. Pat. No. 4,329,611 A.

The disadvantage here is that particular individual components of the known sliding ring arrangements are thermally overloaded comparatively quickly.

SUMMARY OF THE INVENTION

On this basis the object underlying the invention is to create a contact-making rotary transmission, in particular a sliding ring arrangement, which has a comparatively compact design and ensures adequate cooling of its individual components, e.g. the electrically conductive sliding ring contact elements.

The solution to the set object is achieved by an arrangement for guiding and/or holding electrically conductive sliding contact elements, in particular brushes, of a contact-making rotary transmission in order to transmit electrical energy between at least two units which can be moved against one another, having at least one contact path, made of electrically conductive material, which runs along a path movement and at least one stationary receiving shaft, which is formed in each case by walls, wherein at least one wall has guide elements, which are designed such that gaps develop between the sliding contact element and walls of the respective receiving shaft, wherein at least one wall has at least one opening, such that as a result the sliding contact element can be cooled in the receiving shaft.

The solution to the set object is likewise achieved by a contact-making rotary transmission, in particular sliding ring unit with at least one arrangement of this type.

Similarly, the solution to the set object is achieved by a dynamoelectric machine having at least one such contact-making rotary transmission, in particular sliding ring unit, wherein an axial and/or radial cooling air flow is provided in the installation space of the contact-making rotary transmission, which inter alia cools the sliding contact elements.

With the inventive arrangement for guiding and/or holding electrically conductive sliding contact elements, in particular brushes, adequate cooling of these sliding ring contact elements during operation of a dynamoelectric machine is ensured. The receiving shafts in which the sliding ring contact elements are disposed in each case are formed by walls, wherein at least one wall of a receiving shaft has at least one opening in order to cool the sliding ring contact element disposed in the receiving shaft. The contact-making rotary transmission, which has a number of such receiving shafts, is now exposed to an axial and/or radial cooling air flow or a convection, which thus inter alia cool/s the sliding ring contact elements, in particular via these openings in the respective receiving shafts.

Here a brush is a sliding ring contact element, which establishes an electrical contact with a rotating part by way of a sliding contact and thus forms at feast one part of a sliding ring unit. These brushes have graphite and if necessary additional metallic components, for instance.

For larger excitation powers to be transmitted the sliding ring unit has in particular one or a number of the following components, such as signaling units, such as e.g. a wear monitoring unit of the brushes, a temperature monitoring unit, brush lifting devices for one or a number of brushes, a cooling circuit independent of or separated from the dynamoelectric machine.

By means of the inventive arrangement for guiding and/or holding electrically conductive sliding contact elements, in particular brushes, the temperatures of the individual components, particularly the brushes, are reduced significantly. This results in smaller sizes of the overall contact-making rotary transmission, in other words of the sliding ring unit and of the components adjacent thereto.

Moreover, the contact-making rotary transmission can now be operated with comparatively more brushes per phase, which is only possible with difficulty without adequate cooling.

Therefore additional and higher power levels in this entire contact-making rotary transmission and thus in the entire dynamoelectric machine are thus also possible, without increasing the installation volume in particular of the sliding ring unit. This is primarily advantageous in nacelles in wind power plants, since the wind power generators with an inventively equipped sliding ring unit can be embodied very compactly.

Furthermore, an additional cooling, a forced ventilation of this contact-making rotary transmission is not necessarily required, instead the volume flow available in the contact-making rotary transmission on account of a fan present on the extended shaft is sufficient to cool the components, in particular the sliding ring contact elements of the contact-making rotary transmission.

Advantageously the receiving shafts have guide elements on at least two opposing corners, with an essentially rectangular cross-section of the receiving shaft, said guide elements resting directly against the walls or beams of a holding frame. The sliding ring contact elements ultimately have a spacing or gap from the available walls outside of these guide elements, in other words between sliding ring contact element and wall, which also contributes to the cooling. On account of the guide elements, a tilting of the sliding ring contact elements is inter glia avoided with movements within the receiving shaft on openings of the walls.

The sliding ring contact element, in other words in particular the brush, is therefore guided more efficiently and precisely in the receiving shaft through the support or contact on the guide elements and can thus be cooled by way of a cooling air flow across the remaining surface of the sliding ring contact element and also of the open shaft in the region of the walls or between the beams outside of the guide elements.

The contact-making rotary transmission now takes in cooling air for its entire unit via separate cooling air openings on its housing and on account of the now inventively embodied receiving shafts of the sliding contact elements, in other words the arrangement for guiding and/or holding the electrically conductive sliding contact elements, in particular the brushes, a targeted cooling air guidance directly onto the sliding contact elements or the brushes is now also possible and effective. This is particularly advantageous since the critical temperatures prevail there on account of the power transmission of the sliding contact element on the contact path of the rotating part of the sliding ring assembly. Therefore, for cooling efficiency reasons, it is useful to provide these openings particularly on the large-surface walls of the receiving shafts.

The surfaces of these sliding contact elements, in particular the brushes are now therefore exposed directly to a cooling air flow. By means of the cooling, the contact paths running on the sliding ring surface and also the brush temperatures, which are to be regarded as particularly critical on account of the current flow, are now ensured in an operationally correct temperature range and the operation of the contact-making rotary transmission and also the dynamoelectric machine is ensured as a result.

In accordance with the invention, comparatively smaller, more cost-effective components are now to be used and a problem-free operation of the generator and thus of the wind power plant can be ensured at the same time.

BRIEF DESCRIPTION OF THE DRAWING

The invention as well as further advantageous embodiments of the invention are described in more detail on the basis of the exemplary embodiments which follow; in which.

DETAILED DESCRIPTION OF PREFERRED EMBODIMENTS

Figure 1:
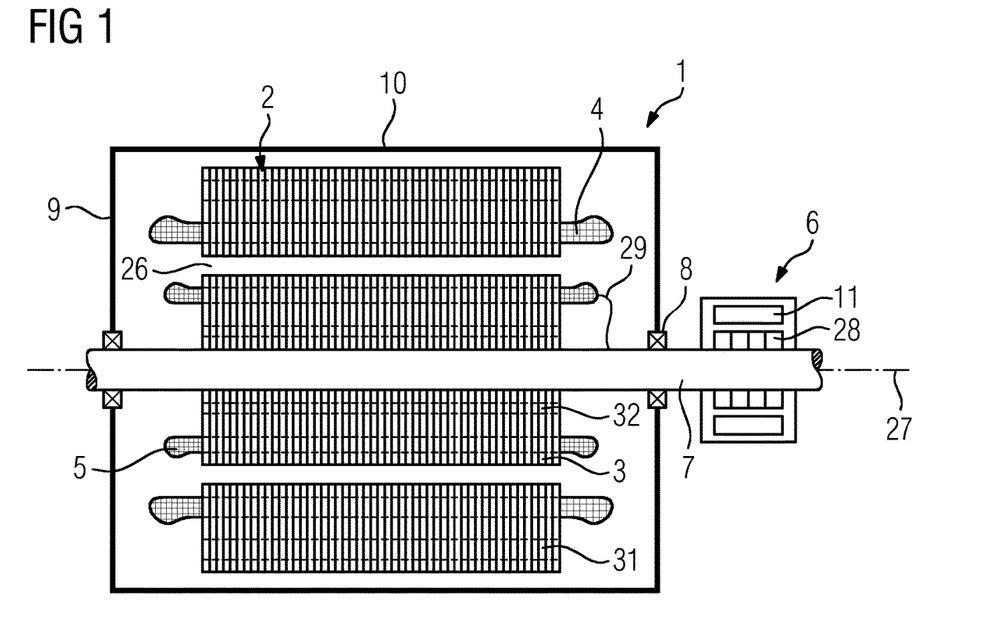
FIG. 1 shows a basic longitudinal section of a dynamoelectric machine.

FIG. 1 shows a basic longitudinal section of a dynamoelectric machine 1, which: is arranged in a housing 10. A laminated stator 2 is disposed in the housing 10, which, during operation, causes a shaft 7 to rotate about an axis 27 through an air gap 26 due to electromagnetic interaction with the rotor 3. The similarly laminated rotor 3 is connected to the shaft 7 in a torsion-resistant manner. The housing 10 is braced against the shaft 7 by way of bearing shields 9 and bearings 8. The winding system 4 of the stator 2 has winding heads on the front sides of the stator 2. Essentially axially running cooling ducts 31, 32 are provided in the stator 2 and/or rotor 3.

Similarly the rotor 3 has winding heads of its winding system 5 on its front sides, said winding system being electrically conductively connected to a sliding ring unit 6 by way of corresponding wires/conductors 29. The winding system 5 of the rotor 3 is energized by way of the sliding ring unit 6. The sliding ring unit 6 consists substantially of a carrier system, which is assembled from carrier segments 11 and contact paths 28, which are electrically conductively connected to the winding system 5 of the rotor 3. The contact paths 28 assigned to one phase of the winding system 5 of the rotor 3 are connected here via electrical conductors 29 to the corresponding segment of the winding system 5 of the rotor 3. In such cases these electrical conductors 29 run in recesses in the shaft 7 or parallel to the axis 27 on the surface of the shaft 7.

Here the contact paths 28 are arranged of grounded components in the sliding ring unit 6, and also insulated from one another.

Alternatively, the sliding ring unit 6 is arranged axially close to in other words directly on the rotor 3, wherein in such cases the bearing 8 is then to be arranged with its bearing shield 9 additionally further to the right. The housing 9 of the dynamoelectric machine 1 then likewise comprises the sliding ring unit 6.

Figure 2:
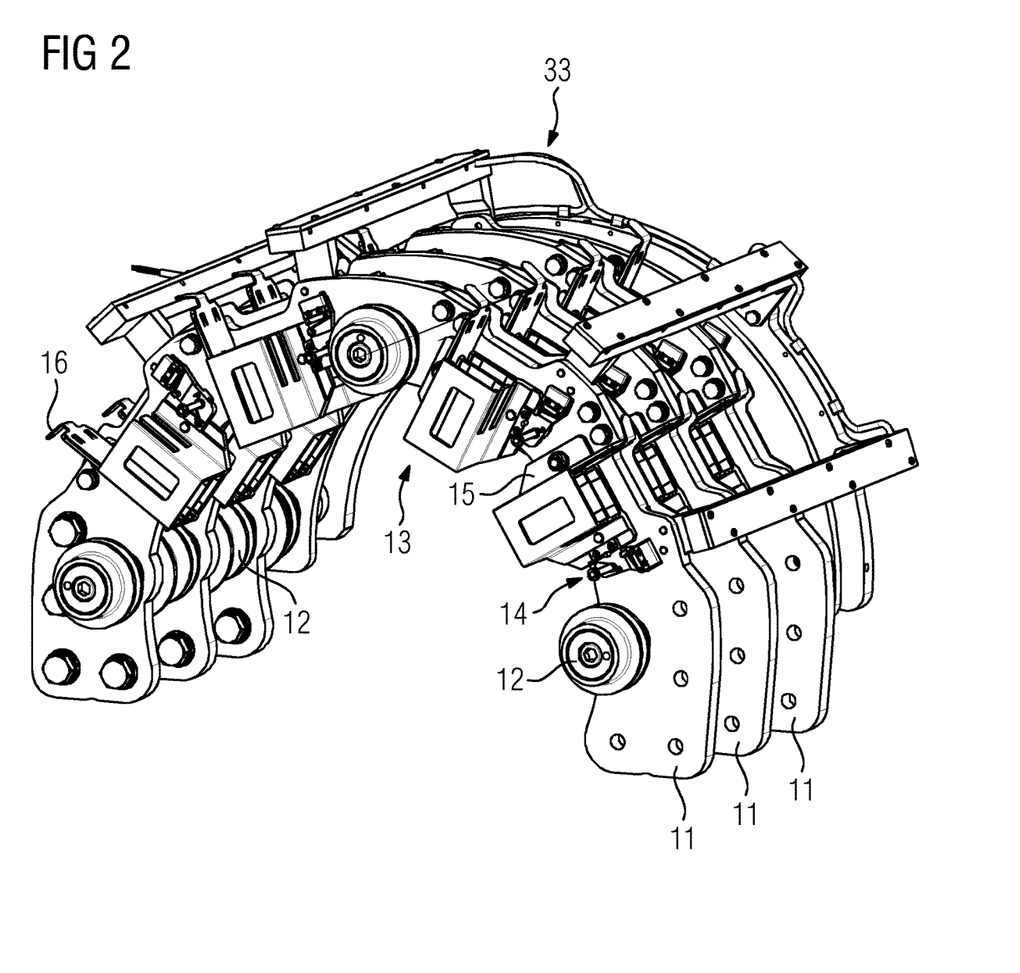
FIG. 2 shows a carrier segment of a sliding ring system.

The sliding ring unit 6 has a number of carrier segments 11 which are arranged axially one behind the other within this sliding ring unit 6. As shown in FIG. 2 each carrier segment 11 has one or a number of brush receptacles 13. Each brush receptacle 13 has one or a number of receiving shafts 25.

In particular with a horizontal alignment of the axis 27 above the shaft 7, the individual carrier segments 11 are arranged in order to maintain a specific contact pressure on the contact paths 28 solely on account of the weight force of the brushes 22. The carrier segments 11 are distanced from one another in the axial direction by the spacers 12, which at the same time electrically insulate the carrier segments 11 from one another. Cooling air can be passed through the intermediate spaces remaining between the carrier segments 11.

Aside from the carrier segments 11 for the power supply of a three-phase system, further carrier segments 11 are optionally also available, which are provided e.g. for earthing the shaft 7 or for transmitting status signals, such as e.g. temperature from or to the rotor 3.

Electrical supply lines 33 to the individual brush receptacles 13 are only shown by way of example in this representation.

Wear monitoring units 14 and also a spring balance 16 are provided on the brush receptacles 13, which are described and shown in more detail below.

Figure 3:
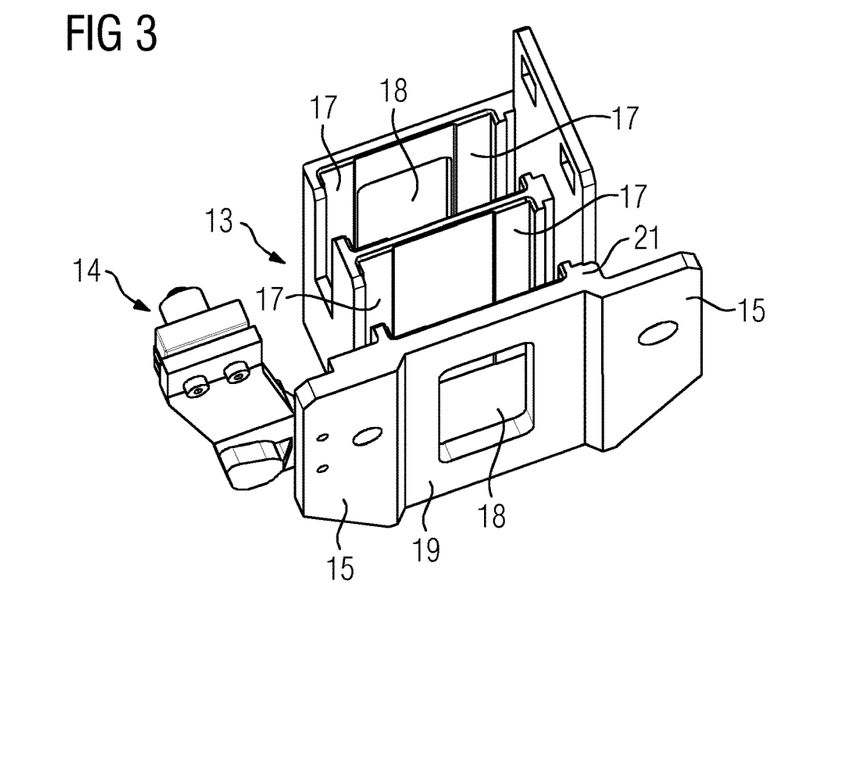
FIG. 3 shows a side perspective view of a brush receptacle for attachment to a carrier segment of the sliding ring system.

FIG. 3 shows a perspective representation of a brush receptacle 13 with two receiving shafts 25, into which brushes 22 are inserted and during operation essentially rest perpendicular to the axis 27 on the contact paths 28. The receiving shafts 25 have essentially a rectangular cross-section, and are, in this respect, delimited by four walls in each case. In the present exemplary embodiment, the brush receptacle 13 has two adjacent shafts with a shared wall 19, wherein two external walls have openings 18 provided for this brush receptacle 13. On account of this opening 18, a cooling air circulating in the sliding ring unit 6 is now able to cool the respective brushes 22 in its receiving shaft 25.

The wear monitoring unit 14 engages in narrow sides of the respective receiving shaft 25 via grooves 23 in this receiving shaft 25, and signals, depending on the wear of the brush 22, to a higher-level signaling office directly on the machine and/or in a control room e.g. that and, if applicable, when a carbon brush is to be replaced.

Figure 4:
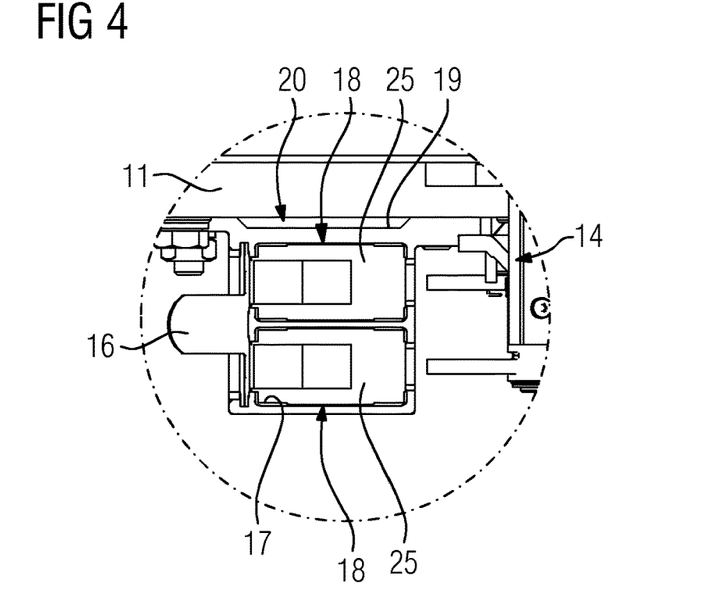
FIG. 4 shows a top view of the brush receptacle.

FIG. 4 shows in a top view onto the brush receptacle 13 the receiving shafts 25 and also the wear monitoring unit 14 as well as a spring balance 16. The spring balance 16 causes a radial force on the brushes 22 (in this case not shown), and therefore exerts a pressure onto the brushes 22, which acts on the respective contact path 28 for a corresponding contact pressure and thus an adequate electric contacting of the brush 22.

Aside from the openings 18 in the walls 19, in order now to retain a cooling, a gap 20 is provided between the carrier segment 11 and the brush receptacle 13, in particular on the side of the brush receptacle 13 which is facing the carrier segment 11, said gap permitting a radial flow of cooling air within the sliding ring unit 6, in order likewise to cool the brush 22 via the opening 18. The cooling of the sliding ring contacts, in other words the brushes 22, is additionally improved by means of the continuous gap 20 along the wall 19 and a flat part of the contact-making rotary transmission, in particular of the carrier segment 11.

When observing the entire sliding ring assembly 6 and its carrier segments 11, the gap 20 is arranged essentially radially and can therefore be passed through by a radial cooling air flow within the sliding ring unit 6.

In order to retain a smooth radial mobility of this brush, the receiving shaft of the brush 22 is provided with guide elements 17 which are embodied as corner profiles in this embodiment. These corner profiles now allow the brush 22 to be guided by way of this comparatively minimal wall contact. Therefore, the brushes 22 and the walls 19 likewise form spaces into which the carbon dust can be discharged and/or cooling air can penetrate and thus contribute to the correct operation of the machine.

Figure 5:
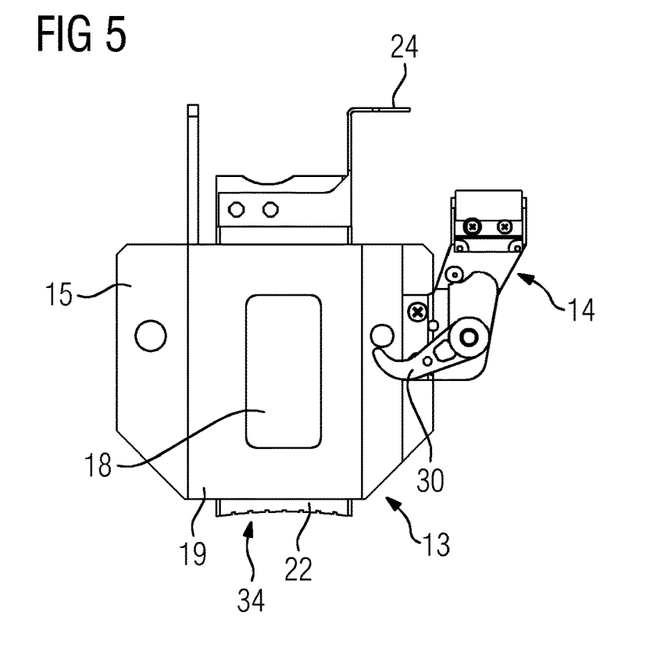
FIG. 5 shows a side view of the brush receptacle.

FIG. 5 shows a side view of the brush receptacle 13 with the wear monitoring unit 14 which has a number of elements. A signaling tab 24, which is fastened directly to the brush 22, presses against a hook-shaped element 30 of the wear monitoring unit 14 and thus triggers a signaling via micro switches.

The brush receptacle 13 is fastened to the carrier segment 11 via tabs 15, which are cast directly on the brush receptacle 13. Depending on the shape of the carrier segment 11, here the tabs 15 can be aligned spatially differently.

The contact surface 24 of the brush 22 is adjusted to the radius of the contact path 28 in order to provide the largest possible transition area for a current to be transmitted.

Figure 6:
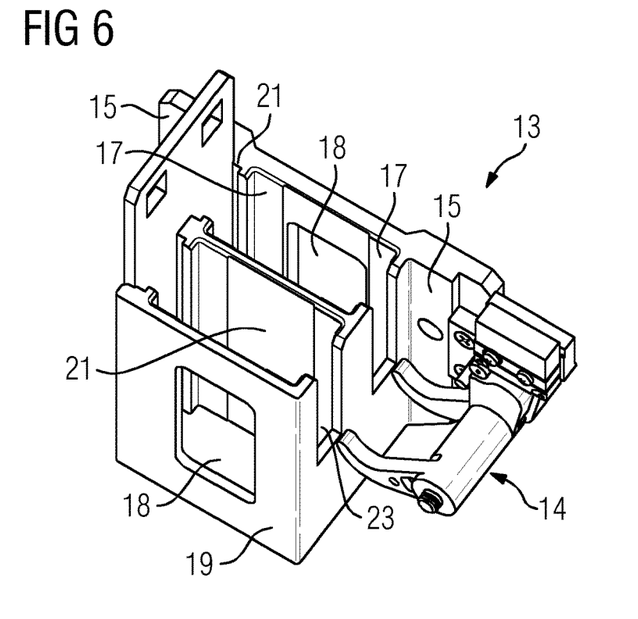
FIG. 6 shows another perspective view of the brush receptacle.

In a further perspective representation FIG. 6 shows the brush receptacle 13 with two parallel receiving shafts 25 with their guide elements 17. The groove 23 is likewise visible, by way of which the signaling tab is guided toward the hook 30 of the wear monitoring unit 14. The present brush receptacle with two parallel receiving shafts 25 can likewise also be embodied with three or four parallel receiving shafts, depending on the application and the current rating to be transmitted.

Similarly, each carrier segment 11, which is provided for an electrical phase, can have a number of brush receptacles arranged one behind the other, viewed in the peripheral direction, so that the output to be transmitted overall is distributed over a number of contact points 28.

Figure 7:
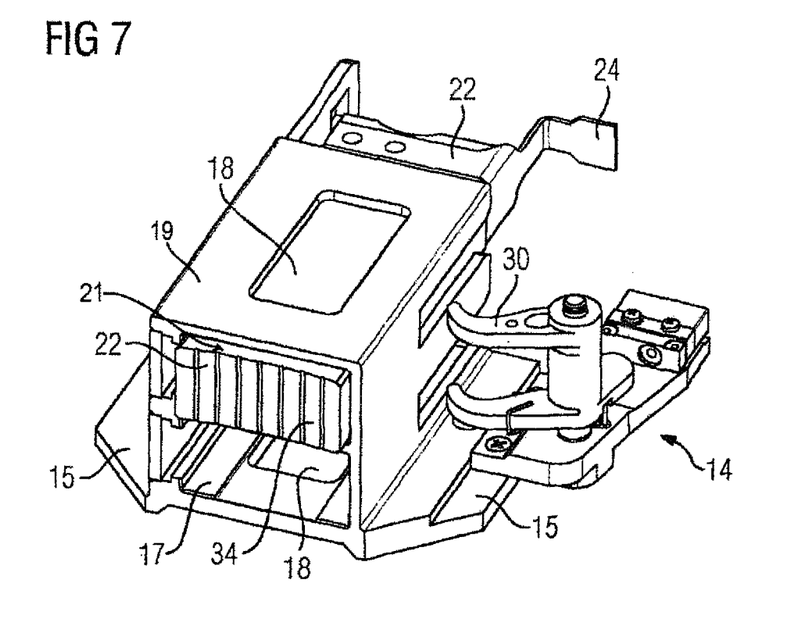
FIG. 7 shows a perspective view of the brush receptacle, depicting placement of a brush in the brush receptacle.

FIG. 7 shows a brush receptacle 13, in which a brush 22, which has the attached signaling tab 24 at its radially upper end, is provided in a receiving shaft 25. Similarly the tab 15 of the brush receptacle 13 is visible, to which the wear monitoring unit 14 can be attached for instance. The contact surface 34 of the brush 22 is embodied to be fluted in order to improve the transport of current. The guide elements 17 are designed in such a way that gaps 21 (cf. also FIG. 6) form between the brush 22 and the walls 19 of the respective receiving shaft 25.

Figure 8:
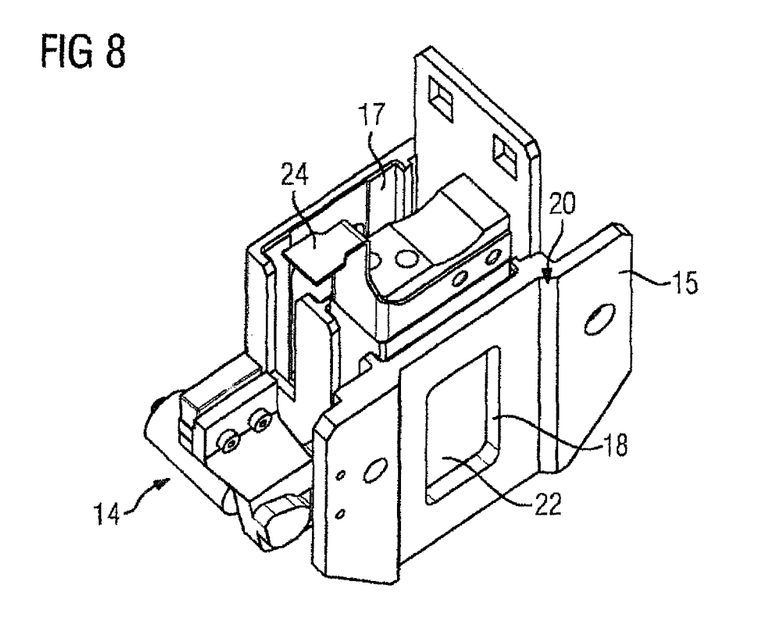
FIG. 8 shows a top perspective view of the brush receptacle of FIG. 7.
Figure 9:
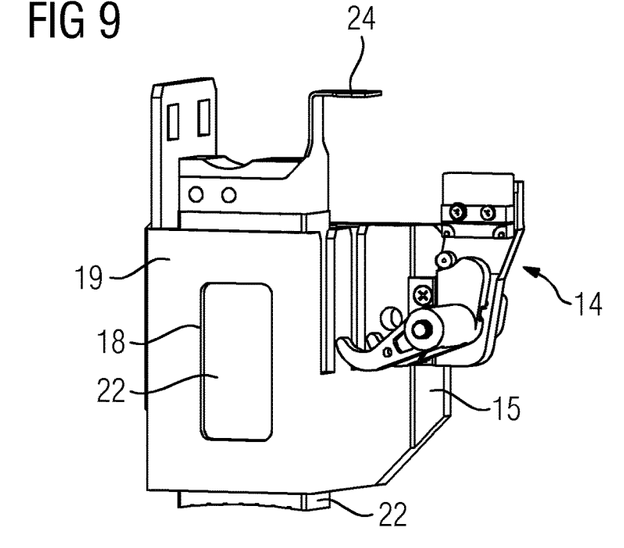
FIG. 9 shows a side perspective view of the brush receptacle of FIG. 7.

Similarly, FIGS. 8 and 9 show further perspective representations of the embodiment just cited.

Figure 10:
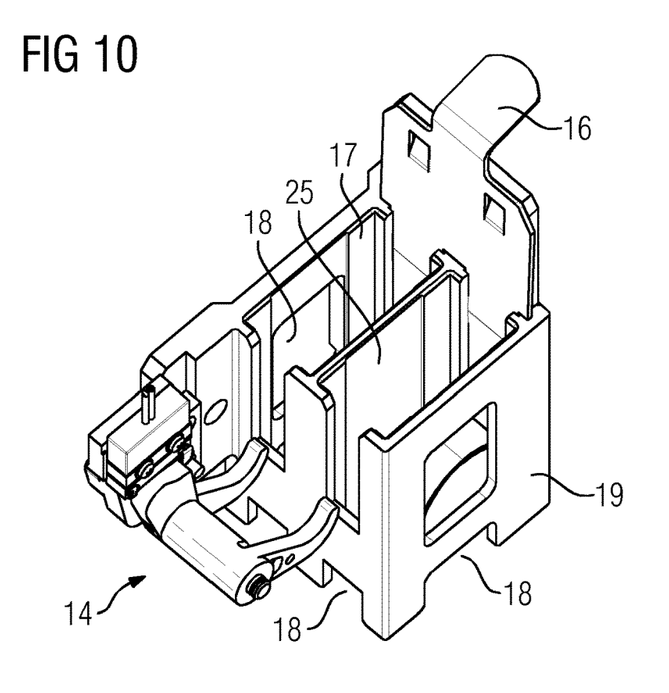
FIG. 10 shows a top perspective view of another embodiment of a brush receptacle.

In a further embodiment FIG. 10 shows an additional optimization of the cooling of a brush receptacle 13 to the effect that virtually every wall 19 has cooling openings 18, without jeopardizing the mechanical stability of the overall brush receptacle 13. In this representation, the spring balance 16 is also shown, by means of which the brushes 22 can be applied with a radial force in both parallel receiving shafts via a tab.

In continuing the inventive idea, now only guide elements 17 which are arranged within a holding frame which forms the receiving shaft 25 or the receiving shafts 25 are ultimately available. The brush receptacle 13 is finally now a holding frame, which, using guide elements 17, holds or guides the brushes 22 respectively in its receiving shaft 25 and where provided has grooves 23 for engaging in the wear monitoring unit 14. It is now essential that as many "free surfaces" as possible, in other words openings 18, are provided on the brush receptacle 13 in order to ensure adequate cooling of the brushes 22.

In each embodiment, the guide elements 17 ensure a friction-optimized radial transport of the brush 22 within its receiving shaft 25, without a tilting within the holding frame or receiving shaft 25.

The receiving shafts 25 of the brush receptacle 13 are either embodied in one piece or provided with at least one separate wall, which can be inserted into receiving slots of the brush receptacle 13.

The use of a contact-making rotary transmission of this type, in particular sliding ring unit 6, is provided above all in wind power generators.

The invention claimed is:

1. A contact-making rotary transmission, comprising:
   at least one brush forming an electrically conductive sliding contact element;
   a contact path of electrically conductive material for contact with the at least one brush; and
   an arrangement for guiding and/or holding the at least one brush, said arrangement including a plurality of carrier segments arranged axially behind one another and distanced from one another in an axial direction by spacers, each said carrier segment having attached thereto at least one brush receptacle such as to define a first gap between the carrier segment and the at least one brush receptacle, said at least one brush receptacle comprising at least one stationary receiving shaft formed by walls and configured to receive the at least one brush, and a guide element which is provided on at least one of the walls of the at least one stationary receiving shaft so as to define a second gap between the at least one brush and the at least one wall, said walls comprising two opposite exterior walls each including an opening in communication with the first and second gaps to allow a flow of cooling air for cooling the at least one brush,
   wherein the at least one brush receptacle is fastened to the carrier segment via tabs which are cast directly on the at least one brush receptacle.

2. The contact-making rotary transmission of claim 1, constructed in the form of a sliding ring unit for a wind power generator.

3. The contact-making rotary transmission of claim 1, wherein the at least one brush receptacle includes two guide elements, said guide elements being embodied as strips arranged on two opposing corners of the at least one stationary receiving shaft, respectively.

4. The contact-making rotary transmission of claim 1, further comprising a wear monitoring unit configured to detect wear of the at least one brush.

5. The contact-making rotary transmission of claim 1, further comprising a pressure element arranged on the at least one stationary receiving shaft to maintain adequate contact pressure between the at least one brush and the contact path.

6. The contact-making rotary transmission of claim 1, wherein the second gap is continuous.

7. A dynamoelectric machine, comprising a contact-making rotary transmission, said contact-making rotary transmission comprising at least one brush forming an electrically conductive sliding contact element, a contact path of electrically conductive material for contact with the at least one brush, and an arrangement for guiding and/or holding the at least one brush, said arrangement including a plurality of carrier segments arranged axially behind one another and distanced from one another in an axial direction by spacers, each said carrier segment having attached thereto at least one brush receptacle such as to define a first gap between the carrier segment and the at least one brush receptacle, said at least one brush receptacle comprising at least one stationary receiving shaft formed by walls and configured to receive the at least one brush, and at least one guide element which is provided on at least one of the walls of the at least one stationary receiving shaft so as to define a second gap between the at least one brush and the at least one wall, said walls comprising two opposite exterior walls each including an opening in communication with the first and second gaps to allow an axial and/or radial flow of cooling air for cooling the at least one brush, wherein the at least one brush receptacle is fastened to the carrier segment via tabs which are cast directly on the at least one brush receptacle.

8. The dynamoelectric machine of claim 7, further comprising a rotor, said contact-making rotary transmission connecting axially to the rotor.

9. The dynamoelectric machine of claim 8, wherein the contact-making rotary transmission is arranged in coaxial relationship to the rotor.

10. The dynamoelectric machine of claim 7, wherein the contact-making rotary transmission is constructed in the form of a sliding ring unit for a wind power generator.

11. The dynamoelectric machine of claim 7, wherein the at least one brush receptacle includes two guide elements, said guide elements being embodied as strips arranged on two opposing corners of the at least one stationary receiving shaft, respectively.

12. The dynamoelectric machine of claim 7, wherein the contact-making rotary transmission includes a wear monitoring unit configured to detect wear of the at least one brush.

13. The dynamoelectric machine of claim 7, wherein the contact-making rotary transmission includes a pressure element arranged on the at least one stationary receiving shaft to maintain adequate contact pressure between the at least one brush and the contact path.

* * * * *